United States Patent
Ng

(10) Patent No.: US 11,647,402 B2
(45) Date of Patent: May 9, 2023

(54) WIRELESS SIGNAL GENERATION FOR TESTING BASE STATIONS THAT SUPPORT NEW RADIO AND NARROWBAND INTERNET OF THINGS SIGNALS

(71) Applicant: Nokia Solutions and Networks Oy, Espoo (FI)

(72) Inventor: Man Hung Ng, Swindon (GB)

(73) Assignee: Nokia Solutions and Networks Oy, Espoo (FI)

( * ) Notice: Subject to any disclaimer, the term of this patent is extended or adjusted under 35 U.S.C. 154(b) by 133 days.

(21) Appl. No.: 17/091,138

(22) Filed: Nov. 6, 2020

(65) Prior Publication Data

US 2021/0144566 A1    May 13, 2021

Related U.S. Application Data

(60) Provisional application No. 62/932,923, filed on Nov. 8, 2019.

(51) Int. Cl.
*H04W 24/02* (2009.01)
*H04W 24/06* (2009.01)
*H04B 17/00* (2015.01)

(52) U.S. Cl.
CPC .......... *H04W 24/02* (2013.01); *H04W 24/06* (2013.01); *H04B 17/0085* (2013.01)

(58) Field of Classification Search
CPC ..... H04W 24/02; H04W 24/06; H04W 16/14; H04B 17/0085; H04B 17/29; H04B 17/354
USPC ......................................... 375/267; 455/424
See application file for complete search history.

(56) References Cited

U.S. PATENT DOCUMENTS

| | | | |
|---|---|---|---|
| 2019/0200202 A1* | 6/2019 | Ko | H04W 24/10 |
| 2019/0246371 A1* | 8/2019 | Hwang | H04W 64/00 |
| 2019/0334632 A1 | 10/2019 | Ng | |
| 2019/0387409 A1* | 12/2019 | Thangarasa | H04W 16/00 |

(Continued)

FOREIGN PATENT DOCUMENTS

| | | | |
|---|---|---|---|
| EP | 3261272 A1 | 12/2017 | |
| WO | WO-2017-220427 A1 | 12/2017 | |

OTHER PUBLICATIONS

"NB-IoT and NR coexistence: Testability", Ericsson, 3GPP TSG-RAN WG4 Meeting #91, R4-1905985, May 2019.

(Continued)

*Primary Examiner* — Don N Vo
(74) *Attorney, Agent, or Firm* — Harrington & Smith

(57) ABSTRACT

A BS generates a test configuration of wireless signals for testing the BS for compliance with one or more criteria. The BS supports NB-IoT signals and NR signals, and is configured to support multiple carriers and to support operation within an RF bandwidth. The test configuration includes: a NB-IoT test signal placed as an outermost carrier at one or both edges of the RF bandwidth but not within a new radio minimum guard band, wherein for NB-IoT operation in new radio in-band, the NB-IoT test signal is placed as an outermost resource block within a NR transmission bandwidth configuration plus 15 kHz at an edge but not within the NR minimum guard band; and further test signal(s), comprising NR signals, in the RF bandwidth. The BS transmits the test configuration of wireless signals.

20 Claims, 8 Drawing Sheets

(56) References Cited

U.S. PATENT DOCUMENTS

2021/0227543 A1* 7/2021 Wang ................ H04W 72/042

OTHER PUBLICATIONS

3GPP TS 36.141 V13.6.0; 3$^{rd}$ Generation Partnership Project; Technical Specification Group Radio Access Network; Evolved Universal Terrestrial Radio Access (E-UTRA); Base Station (BS) Conformance Testing (Release 13) (Dec. 2016).

3GPP TS 36.211 V15.07.0; 3$^{rd}$ Generation Partnership Project; Technical Specification Group Radio Access Network; Evolved Universal Terrestrial Radio Access (E-UTRA); Physical Channels and Modulation (Release 15) (Sep. 2019).

ETSI TS 136 331 V15.7.0; 3GPP TS 36.331 version 15.7.0 Release 15; LTE; Evolved Universal Terrestrial Radio Access (E-UTRA); Radio Resource Control (RRC) (Oct. 2019).

3GPP TS 37.141 V13.5.0; 3$^{rd}$ Generation Partnership Project; Technical Specification Group Radio Access Network; E-UTRA, UTRA and GSM/EDGE; Multi-Standard Radio (MSR) Base Station (BS) Conformance Testing (Release 13) (Dec. 2016).

3GPP TS 38.104 V15.0.0; 3$^{rd}$ Generation Partnership Project; Technical Specification Group Radio Access Network; NR; Base Station (BS) Radio Transmission and Reception (Release 13) (Dec. 2017).

3 GPP TS 38.211 V15.7.0; 3$^{rd}$ Generation Partnership Project; Technical Specification Group Radio Access Network; NR; Physical Channels and Modulation (Release 15) (Sep. 2019).

3 GPP TSG-RAN WG4 Meeting#91; R4-1907809; "WF on Coexistence of NB-IoT with NR" Reno, USA, May 13-17, 2019.

3GPP TSG-RAN WG4 (Radio) Meeting #92; R4-1910486 "Proposals on Definitions of In-Band, Guard Band and Stand Alone Operations when NB-Iot is Located within NR Channel Bandwidth" Ljubljana, Slovenia, Aug. 26-30, 2019.

3GPP TSG-RAN WG4 Meeting#92bis; R4-1912998; "WF on Power Boosting Requirement for NB-Iot Operation in NR In-Band" Chongqing, China, Oct. 14-18, 2019.

3GPP TSG RAN Meeting#83; RP-190757 (Revision of RP-182902) "WID Revision: Additional Enhancements for NB-Iot" Shenzhen, China, Mar. 18-21, 2019.

* cited by examiner

WIRELESS SIGNAL GENERATION FOR TESTING BASE STATIONS THAT SUPPORT NEW RADIO AND NARROWBAND INTERNET OF THINGS SIGNALS

CROSS-REFERENCE TO RELATED APPLICATIONS

This application claims the benefit of U.S. Provisional Application No. 62/932,923, filed on Nov. 8, 2019, the disclosure of which is incorporated herein in its entirety.

TECHNICAL FIELD

This invention relates generally to wireless networks and communications and, more specifically, relates to testing base stations in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

The Internet of Things refers to a rapidly growing network of connected objects that are able to collect and exchange data using, e.g., embedded sensors. Thermostats, cars, lights, refrigerators, and other appliances, for instance, can all be connected to the IoT. For example, lights can be programmed to turn on or off at certain times, change colors, dim, or perform other functions. As another example, an oven or a sous vide machine may be programmed to turn on and come to a certain temperature at a certain time.

Narrowband-Internet of Things (NB-IoT) is a standards-based low power wide area (LPWA) technology developed to enable a wide range of new IoT devices and services. IoT devices that are NB-IoT result in significant improvements in the power consumption of user devices, system capacity and spectrum efficiency.

Because of this, NB-IoT has been identified as one of the main projects for many different groups. The NB-IoT Base Station (BS) core and test requirements were completed in 3GPP RAN4 during 2016. One of the main tasks to specify the test requirements is the definition of the test configurations (TCs) to be used in the tests. See, e.g., the following: 3GPP TS 36.141 V13.6.0 (2016 December), "3rd Generation Partnership Project; Technical Specification Group Radio Access Network; Evolved Universal Terrestrial Radio Access (E-UTRA); Base Station (BS) conformance testing (Release 13)" and 3GPP TS 37.141 V13.5.0 (2016 December), "3rd Generation Partnership Project; Technical Specification Group Radio Access Network; E-UTRA, UTRA and GSM/EDGE; Multi-Standard Radio (MSR) Base Station (BS) conformance testing (Release 13)".

Currently, NB-IoT coexistence with New Radio (NR) is being studied in 3GPP RAN4 as part of the ongoing Work Item (WI) on Additional enhancements for NB-IoT. See RP-190757, Huawei, "WID revision: Additional enhancements for NB-IoT", 3GPP TSG RAN meeting #83, Shenzhen, China, Mar. 18-21, 2019. Testability applicable to radio frequency (RF) is listed as one of the objectives; here again one of the main tasks is the definition of the TC(s) to be used in the tests.

BRIEF SUMMARY

This section is intended to include examples and is not intended to be limiting.

In an exemplary embodiment, a method is disclosed that includes generating a test configuration of wireless signals for testing a base station, which supports Narrow Band Internet of Things signals and new radio signals, for compliance with one or more criteria. The base station is configured to support multiple carriers and to support operation within a radio frequency bandwidth. The test configuration comprises: a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band. The test configuration also comprises one or more further test signals, comprising new radio signals, in the radio frequency bandwidth. The method includes transmitting from the base station the test configuration of wireless signals.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to: generate a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises: a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and one or more further test signals, comprising new radio signals, in the radio frequency bandwidth; and transmit from the base station the test configuration of wireless signals.

An exemplary computer program product includes a computer-readable storage medium bearing computer program code embodied therein for use with a computer. The computer program code includes: code for generating a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises: a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and one or more further test signals, comprising new radio signals, in the radio frequency bandwidth; and code for transmitting from the base station the test configuration of wireless signals.

In another exemplary embodiment, an apparatus comprises means for performing: generating a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises: a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and one or more further test signals, comprising new radio signals, in the radio frequency bandwidth; and transmitting from the base station the test configuration of wireless signals.

DETAILED DESCRIPTION OF THE DRAWINGS

Figure 1:
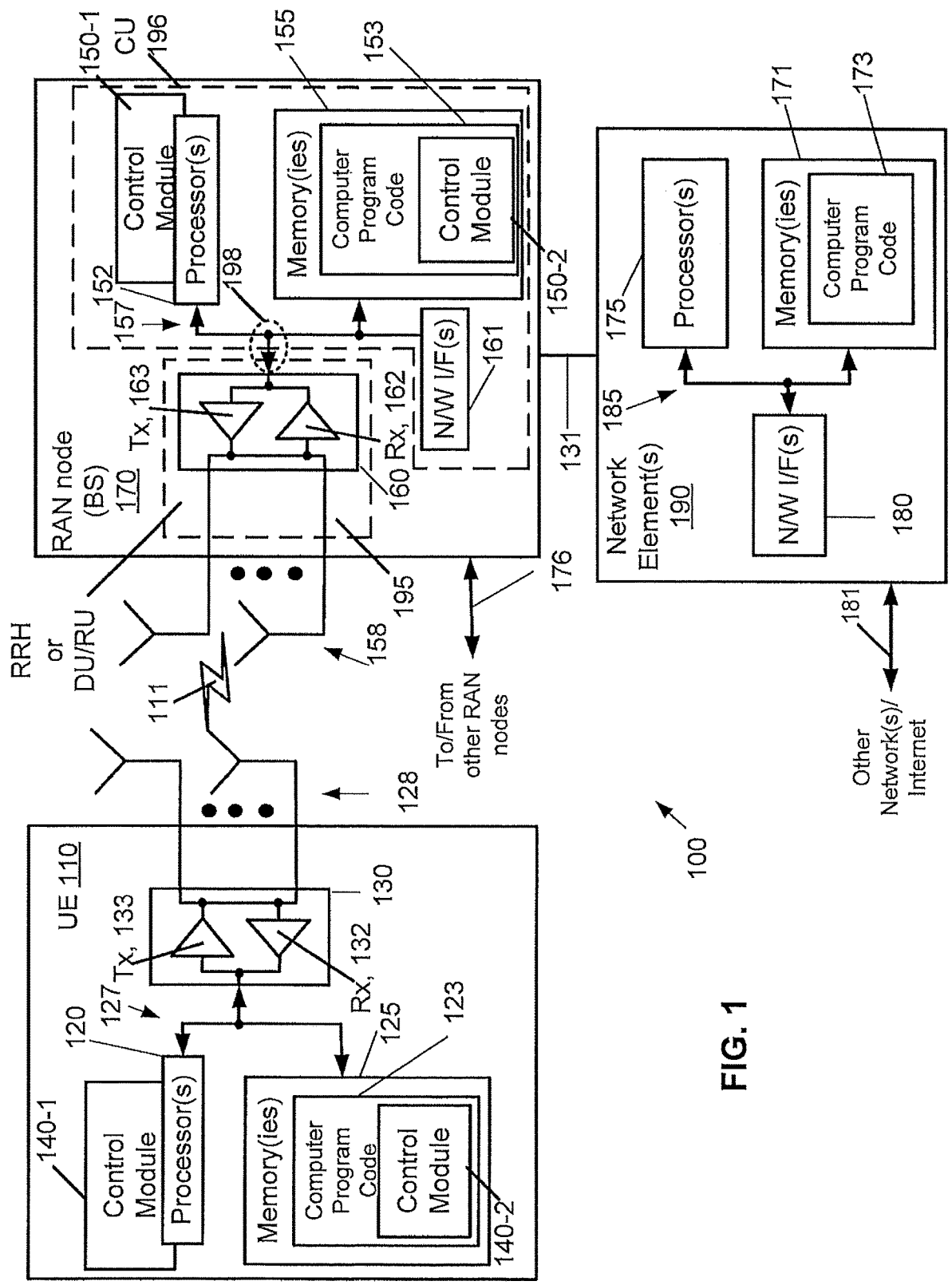
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
BS base station
CU central unit
DC direct current
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
NB-IoT Narrowband-Internet Of Things
ng or NG next generation
ng-eNB or NG-eNB next generation eNB
NR new radio
N/W or NW network
OFDM orthogonal frequency division multiplexing
PDCP packet data convergence protocol
PHY physical layer
PRB physical resource block
PSD power spectral density
RAN radio access network
RAN4 Radio Access Network Working Group 4
Rel release
RF Radio Frequency
RLC radio link control
RRH remote radio head
RRC radio resource control
RS Reference Symbol
RU radio unit
Rx receiver
SC sub-carrier SDAP service data adaptation protocol
SGW serving gateway
SMF session management function
TC test configuration
TS technical specification
Tx transmitter
UE user equipment (e.g., a wireless, typically mobile device)
UL uplink
UPF user plane function
UMTS universal mobile telecommunications system
UTRA UMTS terrestrial radio access
WI work item The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for testing base stations that support new radio and narrowband internet of things (IoT) signals. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a network (e.g., access) node such as a base station (BS) that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

Having thus introduced one suitable but non-limiting technical context for the practice of the exemplary embodiments of this invention, the exemplary embodiments will now be described with greater specificity.

It is noted that RAN node 170 is referred to below as a Base Station (BS) 170. This is, however, for ease of reference, and other RAN nodes as outlined above may be used.

The unique problem for testing BSs that support NR and NB-IoT (as compared to testing BS that support E-UTRA and NB-IoT) is that NB-IoT is based on the E-UTRA air interface, where the in-band and guard band NB-IoT operation modes are designed assuming the existence of a hosting E-UTRA carrier. Therefore, when the hosting E-UTRA carrier is migrated to NR, two compatibility issues will need to be solved for testing BS RF with the NR and NB-IoT carriers:

1) Unlike the E-UTRA air interface, there is no sub-carrier (SC) reserved for the direct current (DC) in NR downlink (DL), and the same SC grid is used in the uplink (UL) and DL of NR so there is no 7.5 kHz offset between the UL and DL SC grid in NR.

2) There are differences between the control signals design in NR compared to those in E-UTRA, e.g., for reference symbol (RS), so some of the control signals that would be present in the hosting E-UTRA carrier would become absent when the hosting E-UTRA carrier is migrated to NR.

There is no existing solution to this problem, because TC for testing BS that support NR and NB-IoT has not started in 3GPP RAN4.

Three NB-IoT operation modes were specified in 3GPP RAN4 during 2016, namely (see 3GPP TS 36.141 V13.6.0 (2016 December)):

1) NB-IoT In-band operation: NB-IoT is operating in-band when it utilizes the resource block(s) within a normal E-UTRA carrier.

2) NB-IoT guard band operation: NB-IoT is operating in guard band when it utilizes the unused resource block(s) within a E-UTRA carrier's guard-band.

3) NB-IoT standalone operation: NB-IoT is operating standalone when it utilizes its own spectrum, for example the spectrum currently being used by GERAN systems as a replacement of one or more GSM carriers, as well as scattered spectrum for potential IoT deployment.

To deal with the two compatibility issues listed above, 3GPP RAN4 has recently agreed to specify two more operation modes for NB-IoT operating within NR channel bandwidth (see R4-1910486, Nokia, Nokia Shanghai Bell, "Proposals on definitions of in-band, guard band and standalone operations when NB-IoT is located within NR channel bandwidth", 3GPP TSG-RAN WG4 (Radio) Meeting #92, Ljubljana, Slovenia, 26-30 Aug. 2019):

1) NB-IoT operation in NR in-band: NB-IoT is operating in-band when it is located within a NR transmission bandwidth configuration plus 15 kHz at each edge but not within the NR minimum guard band, $GB_{Channel}$.

2) NB-IoT operation in NR guard band: NB-IoT is operating in a guard band when it is located within a NR BS channel bandwidth but is not NB-IoT In-band operation.

Note that considering legacy deployments, even if one NB-IoT 15 kHz SC would operate in a NR guard band, this case is still considered as NB-IoT operation in NR in-band, which would be 15 kHz narrower than the E-UTRA in-band including the DC SC. In additional detail, since NR does not have a DC sub-carrier, the in-band width of a NR carrier would be 15 kHz less than that of an equivalent (same bandwidth, same spectrum utilization) LTE carrier. Thus 15 kHz is added to the NR in-band width for NB-IoT operation in NR in-band, so that the NB-IoT carrier operating at the in-band edge of an LTE carrier would still be classified as NB-IoT operation in NR in-band even if 15 kHz of the NB-IoT carrier is outside the NR in-band width. This extra 15 kHz is one main issue to be solved in the testing.

It should be noted that E-UTRA PRBs are defined in clause 5.2.3 in 3GPP TS 36.211 (e.g., 3GPP TS 36.211 V15.7.0 (2019 September)) and NR PRBs are defined in clause 4.4.4 in 3GPP TS 38.211 (e.g., 3GPP TS 38.211

V15.7.0 (2019 September)). These sections may be used to define the different structures of PRBs between E-UTRA and NR.

Each NB-IoT carrier is 180 kHz wide and contains twelve 15 kHz or forty-eight 3.75 kHz tones. Furthermore, in order to support enhanced downlink coverage for NB-IoT, it was specified in 3GPP RAN4 during 2016 (see, e.g., the following: 3GPP TS 36.141 V13.6.0 (2016 December)) that a NB-IoT BS 170 should support at least 6 dB power boosting for a Physical Resource Block (PRB) in E-UTRA in-band or 180 kHz in E-UTRA guard band (for E-UTRA channel bandwidth larger than or equal to 5 MHz), comparing to the average power over all carriers (both E-UTRA and NB-IoT).

For NB-IoT operation in NR in-band, 3GPP RAN4 has recently agreed to specify at least 6 dB of power boosting for a NB-IoT PRB within at least center 90% of NR channel bandwidth. See R4-1912998, Nokia et al., "WF on power boosting requirement for NB-IoT operation in NR in-band", 3GPP TSG-RAN WG4 Meeting #92bis, Chongqing, China, 14-18 Oct. 2019. That is, NB-IoT PRB power boosting was first specified in the first version of NB-IoT operating with LTE in 2016, and power boosting is now specified in 2019 also for NB-IoT operating with NR.

The inventor has realized that the power boosting is useful for testing base stations, as if the NB-IoT PRB(s) are placed nearer other signals, this makes for more challenging transmission and/or reception. More particularly, the inventor of the instant application recognized that when testing a base station, in order to limit the number of test signals used, it would be desirable to use test signals that provide challenging test conditions. Furthermore, NB-IoT signals are not limited to a particular radio spectrum and as such may be transmitted across the radio frequency bandwidth of a base station that supports multiple carriers. Thus, when testing for compliance of the base station for transmitting these signals, it is not sufficient to test each individual carrier. The inventor recognized that signals transmitted close to an edge of the radio frequency bandwidth are more challenging for the base station to both transmit and receive while still meeting required compliance criteria. In the transmission, bandwidth signals towards the edge create potential problems with leakage to neighboring channels, while in the reception, bandwidth the characteristics of the receiver filter may be an issue towards the edge of the bandwidth supported by the base station.

Thus, a testing regime is desired that is both rigorous and not too onerous, and uses a testing configuration algorithm which generates challenging signals. Thus, the inventor selected test signals towards either edge of the whole radio frequency bandwidth of the base station in the realization that, were the criteria to be met for these signals, then it is likely that the criteria will be met for most possible operating conditions.

It should be noted that signals towards edges of the radio frequency bandwidth may be ones at an outermost location within a communication portion of the bandwidth or they may be ones in a guard band or they may be ones offset from the edge of the radio frequency bandwidth by some small amount. In all cases, they are signals within a frequency range that forms the outermost 10%, preferably 5% of the radio frequency bandwidth.

At least one of the test signals is an NB-IoT test signal, that is a test signal that has a same configuration/coding and bandwidth as any other NB-IoT signal. Such a signal will mimic such signals and provide an indication as to whether the transmission or reception of such signals meet the required criteria or not. Thus, the test signal may be coded using OFDM (orthogonal frequency division multiplexing) and will have bandwidth of 180 KHz.

The base station supports multiple carriers and each carrier is transmitted or received on a particular channel having a certain frequency bandwidth reserved for that channel. These carriers are all transmitted or received within respectively the transmission or reception radio frequency bandwidth of the base station which encompasses all of the respective channels. NB-IoT signals are not limited to a particular carrier but may be located at any point within the bandwidth. Thus, testing these signals towards an edge mimics a real signal albeit a challenging one.

In some embodiments, said one further test signal comprises one of a NB-IoT test signal and a test signal comprising a physical resource block (PRB) of one of the plurality of carriers.

There may be two test signals located towards either edge of the radio frequency bandwidth. In some cases, they may both be NB IoT signals, and in this case the issues arising from such signals at either edge of the bandwidth can be tested. In other cases, one of the test signals is a NB IoT signal while the other is a test signal of one of the carriers supported by the base station located towards that edge of the radio frequency bandwidth. It is recognized that the base station supports multiple carriers as well as NB IoT signals. Thus, testing NB IoT signals in conjunction with a test signal that mimics a signal transmitted by the base station, from one of the carriers, provides an indication of problems arising due to interference such as intermodulation distortion between the signals and also shows how each signal affects the base station's compliance with the required criteria.

The criteria that a base station needs to meet for compliance are relevant both to transmission and to reception. Where reception is concerned, then the receiver on the base station needs to be able to receive the NB-IoT signals wherever in the spectrum of the radio frequency bandwidth they are transmitted and in the presence of interfering signals. Thus, when testing the receiver in addition to the test signals towards the edge of the radio frequency bandwidth, additional interfering signals are transmitted and the ability of the receiver to receive and decode the test signals in the presence of such interference is tested.

In addition to a reception radio frequency bandwidth, the base station will be configured to transmit within a transmission radio frequency bandwidth which will be different to the reception bandwidth to reduce interference between transmitted and received signals. The transmission bandwidth has to meet predetermined criteria in order for the base station to comply with certain requirements and these generally relate to leakage to neighboring bandwidths which might affect the operation of other base stations.

In order to avoid or at least reduce leakage of signals into neighboring frequency bands, the base station has a transmit filter that reduces the transmission of signals outside the operating bandwidth. For signals towards the edge of the radio frequency bandwidth this filter requires a steeper roll off and thus, these are the signals that are the most challenging when the criteria are to be met. Thus, selecting test signals at or close to an edge of the operating bandwidth allows the leakage of signals into adjacent channels to be tested for challenging operating conditions.

In order to make the test signal more challenging, it may have its power boosted, as this potentially increases leakage to neighboring channels. The NB-IoT test signal may be the signal that is selected for boosted power, as where such a boosted power signal meets the requirements for compliance, it is likely that the base station is able to operate across its radio frequency bandwidth while meeting the criteria. It should be noted that generally when transmitting, a base station will split its power between the signals it is transmitting. Boosting the power of one test signal allows a challenging test to be performed.

With the narrower bandwidth (180 kHz) and power boosting (6 dB) of the NB-IoT carrier, it is anticipated that the Power Spectral Density (PSD) of the NB-IoT carrier will be higher than the remaining NR carriers. A higher PSD carrier at the edge of the BS RF bandwidth in the TC generally represents a more demanding TC for emission tests (e.g., operating band unwanted emissions), as the RF transmit filter design will need to provide a steeper roll-off to meet the emission requirements adjacent to the RF bandwidth edge.

Therefore, the inventor has realized and it is proposed herein to define the TC for testing BS that support NR and NB-IoT with the (power boosted for in-band operation) NB-IoT carrier placed as the outermost carrier at one or both edges of the BS RF bandwidth (but not within the NR minimum guard band). For NB-IoT operation in NR in-band, the power boosted in-band PRB should be placed as the outermost RB within the NR transmission bandwidth configuration plus 15 kHz at each edge but not within the NR minimum guard band. Several of these test configurations are provided in the description below.

Moreover, the inventor has realized and it is proposed herein to configure (in RRC signaling perspective) the NB-IoT E-UTRA guard band operation mode during the tests when there is no hosting E-UTRA carrier in the TC. This can avoid the need to transmit the in-band E-UTRA control signals, as well as the constraints with the NB-IoT standalone operation (e.g., allowed NB-IoT carrier offsets and 100 kHz guard band) during the tests. Note that 3GPP RAN4 has agreed (see R4-1907809, Huawei et al., "WF on coexistence of NB-IoT with NR", 3GPP TSG-RAN WG4 Meeting #91, Reno, USA, May 13-17, 2019) that NB-IoT operating in NR guard band is handled as implementation issue and RF requirements are not specified in Rel-15 (nor in Rel-16 unless new Rel-16 features make this essential), hence NB-IoT operating in NR guard band mode would not be configured during the tests.

In more detail, currently NB-IoT operation mode is configured in the E-UTRA signalling, refer to clause 6.7.2 in 3GPP TS 36.331 (e.g., 3GPP TS 36.331 V15.7.0 (2019 September)):

operationModeInfo

Deployment scenario (in-band/guard-band/standalone) and related information. See TS 36.211 [21] and TS 36.213 [23].

Inband-SamePCI indicates an in-band deployment and that the NB-IoT and LTE cell share the same physical cell id and have the same number of NRS and CRS ports.

Inband-DifferentPCI indicates an in-band deployment and that the NB-IoT and LTE cell have different physical cell id.

guardband indicates a guard-band deployment.

standalone indicates a standalone deployment.

Now when NB-IoT is operated within NR in-band, there may not be any actual E-UTRA carrier for hosting the NB-IoT in-band or guard band. However, there would still be a need to configure the BS in one of the NB-IoT operation modes to generate the NB-IoT carrier (during the tests or even actual deployment in the field). As discussed above, configuring the BS in either in-band or stand-alone (in term of E-UTRA signalling) is problematic, and the BS should be configured as NB-IoT guard band operation mode in case this configuration is necessary.

FIGS. 2-7 illustrate exemplary test configurations. These test configurations are used to address testing of base stations.

Figure 2:
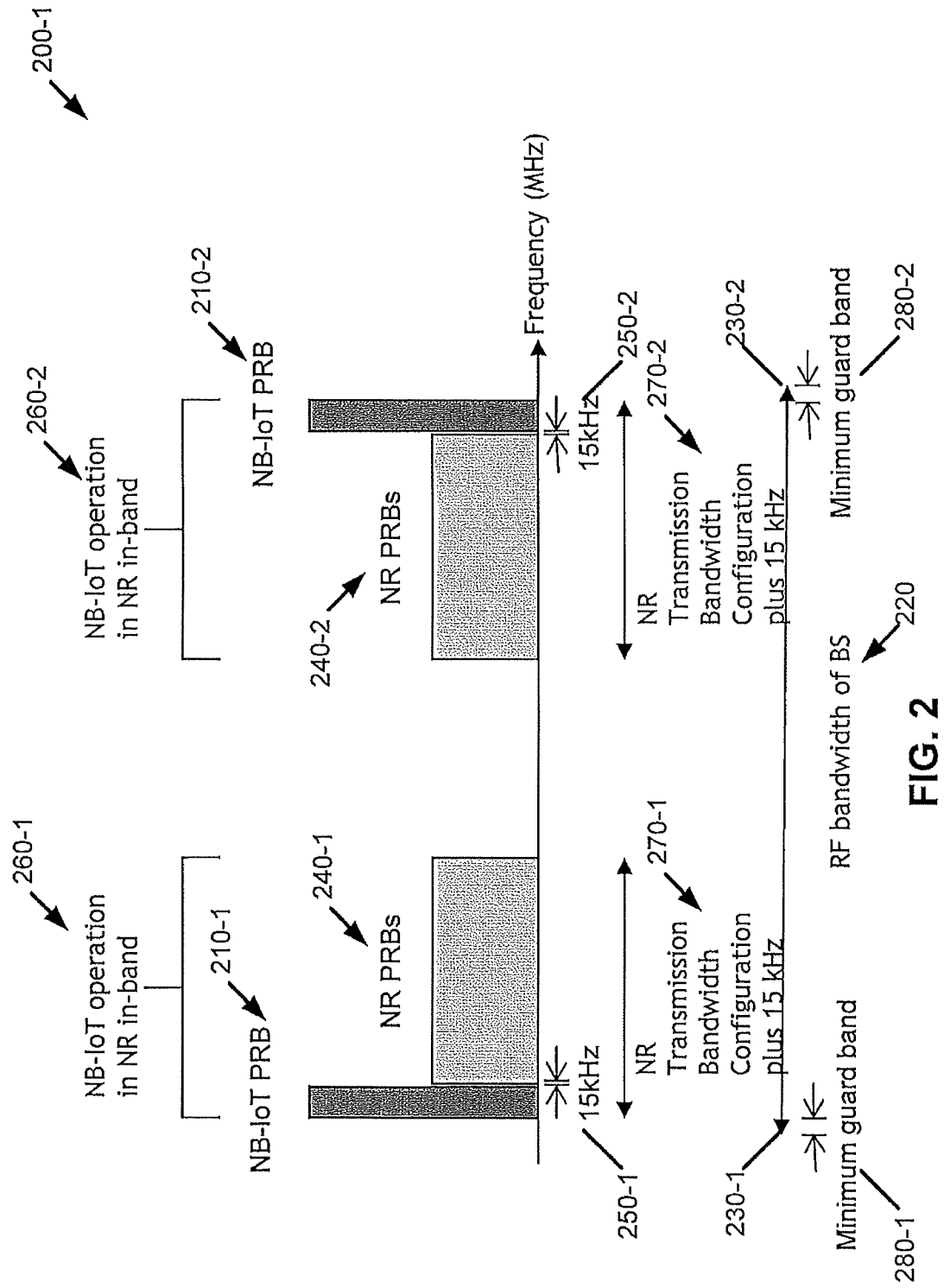
FIG. 2 illustrates one test configuration comprising one power boosted in-band NB-IoT PRB that is placed at one edge of the BS RF bandwidth, while one power boosted in-band NB-IoT is placed at the other edge of the BS RF bandwidth, in accordance with an exemplary embodiment.

In one embodiment, turning to FIG. 2, a test configuration 200-1 is shown comprising one power boosted in-band NB-IoT PRB 210-1 that is placed at one edge 230-1 of the BS RF bandwidth 220, while one power boosted in-band NB-IoT PRB 210-2 is placed at the other edge 230-2 of the BS RF bandwidth. These are illustrations of the NB-IoT operation in the NR in-band 260-1, 260-2. Each NB-IoT PRB 210-1, 210-2 is placed at the outermost RB within the NR transmission bandwidth configuration plus 15 kHz regions 270-1, 270-2 at each corresponding edge 230-1, 230-2 but not within the corresponding NR minimum guard band 280-1, 280-2. The extra 15 kHz regions are illustrated using reference numbers 250-1, 250-2. The NB-IoT operations 260-1 and 260-2 in NR in-band also include corresponding NR PRBs 240-1, 240-2. 15 kHz is the minimum width of one NR sub-carrier (called the lowest sub-carrier spacing in 3GPP specification). The NR minimum guard band 280 is specified in Table 5.3.3-1 in 3GPP TS 38.104 for each NR channel bandwidth and sub-carrier spacing. These guard bands 280 are the range where no sub-carrier should be located, i.e., the extra 15 kHz region cannot be applied when it steps into the minimum guard band.

As further detail, the NR transmission bandwidth configuration 270-1 is 15 kHz less than what the "equivalent" E-UTRA transmission bandwidth configuration would be for in-band operation. The NB-IoT PRB (even though it is called NR in-band) is allowed to be outside the NR transmission bandwidth configuration 270-1 by 15 kHz. The total BW of the NR PRBs would be the (NR transmission bandwidth configuration plus the 15 kHz) minus (BW of the NB-IoT PRB plus 15 kHZ). Because of this extra 15 kHz, there is a gap that is allowed between the NB-IoT PRBs and the NR PRBs and still be considered to meet its criteria (as compared to E-UTRA PRB operation, where the NB-IoT carrier is adjacent to the E-UTRA PRBs). It is noted that the 15 kHz gap may not exist if the minimum guard band condition kicks in to prevent the extra 15 kHz from being added to the NR transmission bandwidth configuration. This note is also true throughout the various embodiments further described below.

It is noted that the power boost is at least 6 dB or 3 dB. The 3 dB power boost is specified for the NB-IoT PRB at the edges of the NR transmission bandwidth configuration for greater than 10 MHz channel bandwidth, considering the larger spectrum utilization for NR compared to E-UTRA.

Figure 3:
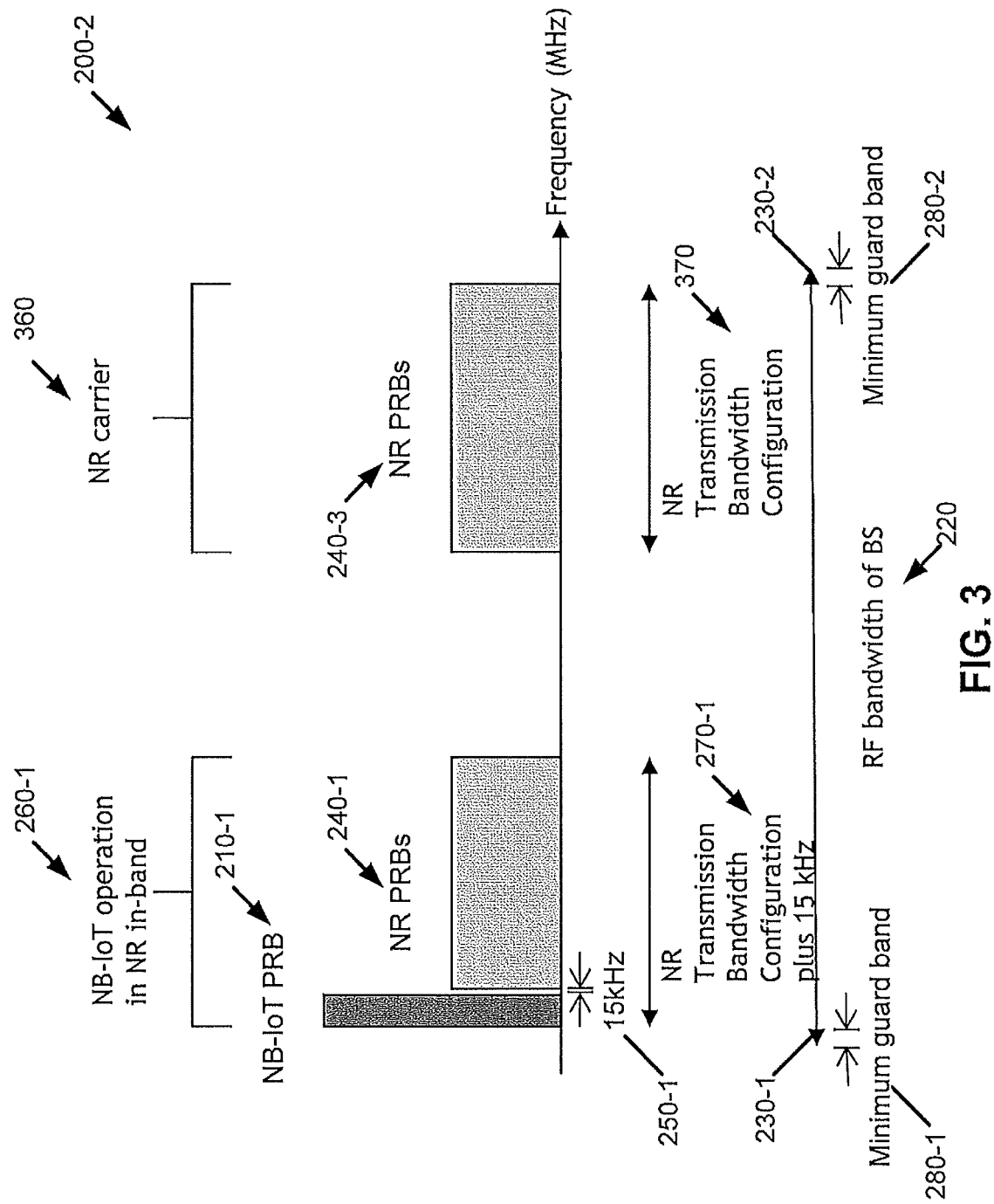
FIG. 3 illustrates one test configuration comprising one power boosted in-band NB-IoT PRB that is placed at one edge of the BS RF bandwidth, while one or more NR carrier(s) is(are) placed at the other edge of the BS RF bandwidth, in accordance with an exemplary embodiment.

In a further embodiment, in FIG. 3, another test configuration 200-2 is shown that includes one power boosted in-band NB-IoT PRB 210-1 that is placed at one edge 230-1 of the BS RF bandwidth 220, while one or more NR carriers 360 is(are) placed at the other edge 230-2 of the BS RF bandwidth, the NB-IoT PRB 210-1 is placed at the outermost RB within the NR transmission bandwidth configuration 270-1 plus 15 kHz region 250-1 at one edge but not within the NR minimum guard band 280-1, 280-2. The NR transmission bandwidth configuration 370 is shown without the extra 15 kHz region for NB-IoT operation in NR in-band and thus the NR PRBs 240-3 could extend all the way to the edge 230-2 of the RF bandwidth 220.

Figure 4:
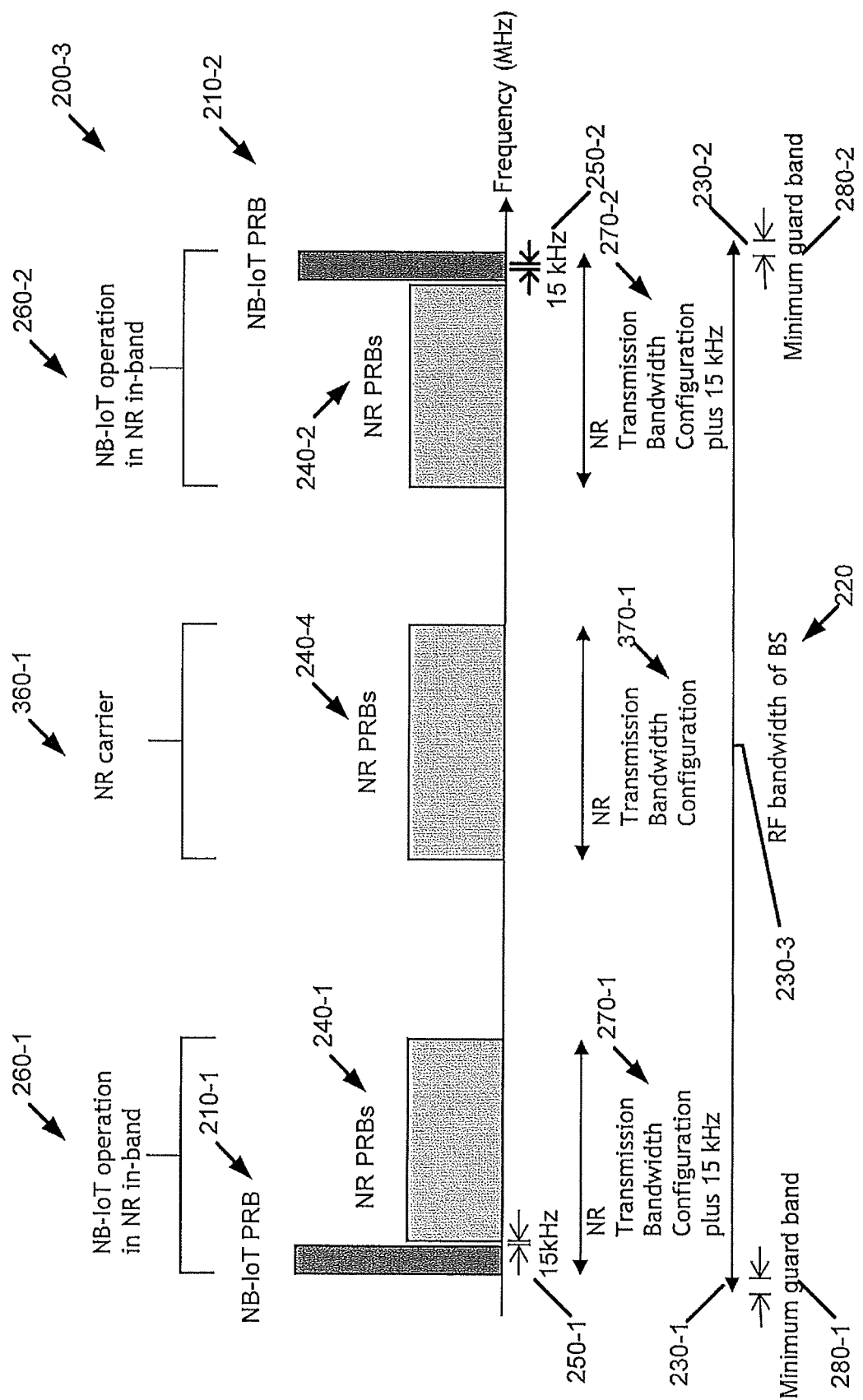
FIG. 4 illustrates one test configuration comprising one power boosted in-band NB-IoT PRB that is placed at each edge of the BS RF bandwidth, while one or more NR carrier(s) is(are) placed in the middle of the BS RF bandwidth, in accordance with an exemplary embodiment.

In another exemplary embodiment, as illustrated by FIG. 4, another test configuration 200-3 is shown including one power boosted in-band NB-IoT PRB 210-1, 210-2 that is placed at each edge 230-1, 230-2 along with corresponding NR PRBs 240-1, 240-2 of the BS RF bandwidth 230, while one or more additional NR carriers 360-1 is(are) placed in the middle 230-3 of the BS RF bandwidth (illustrated as NR PRBs 240-3 in a NR transmission bandwidth configuration 370-1). Further, each NB-IoT PRB 210-1, 210-2 is placed at the outermost RB within the NR transmission bandwidth configuration 270-2, 270-2 plus 15 kHz regions 250-1, 250-2 at each edge but not within the NR minimum guard band 280-1, 280-2.

Figure 5:
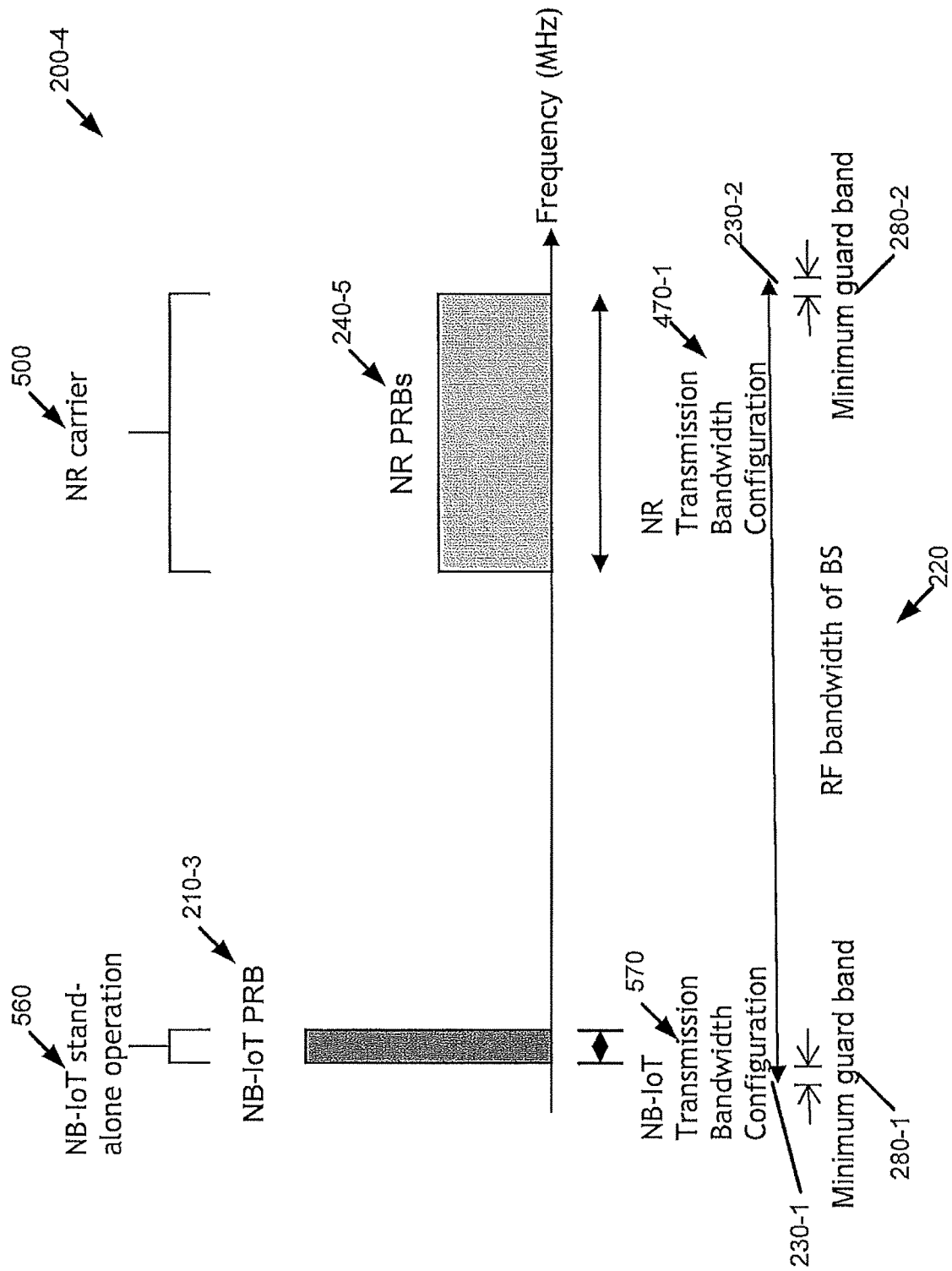
FIG. 5 illustrates one test configuration comprising one stand-alone NB-IoT carrier that is placed at one edge of the BS RF bandwidth, while one or more NR carrier(s) is(are) placed at the other edge of the BS RF bandwidth, in accordance with an exemplary embodiment.

In an additional exemplary embodiment, as illustrated by FIG. 5, yet another test configuration 200-4 is shown that comprises one stand-alone NB-IoT carrier (e.g., the NB-IoT PRB 210-3) that is placed at one edge 230-1 of the BS RF bandwidth 220, as illustrated by the NB-IoT stand-alone operation 560 (see also the NB-IoT transmission bandwidth configuration 570), while one or more NR carriers 360 is(are) placed (as represented by NR PRBs 240-5) at the other edge 230-2 of the BS RF bandwidth 220, as illustrated by the NR transmission bandwidth configuration 370. The minimum guard bands 280-1, 280-2 are also illustrated. It is noted that this is NB-IoT stand-alone operation, not confined to the NR channel bandwidth so there is no need to consider minimum guard band and the 15 kHz extra. However, 100 kHz may be specified as a minimum gap from the stand-alone NB-IoT carrier to BS RF bandwidth edge 230-1 in 3GPP TS 36.141. See Table 5.6-3A in TS 36.141 as a reference, and note that the 200 kHz offset mentioned there is measured from the NB-IoT carrier center and thus RF requirements apply 100 kHz outside the NB-IoT carrier, which itself is 200 kHz wide (i.e. requirements apply 110 kHz outside the NB-IoT 180 kHz PRB edge). This 100 kHz minimum gap may also be applied to the stand-alone NB-IoT carriers in other embodiments herein.

Figure 6:
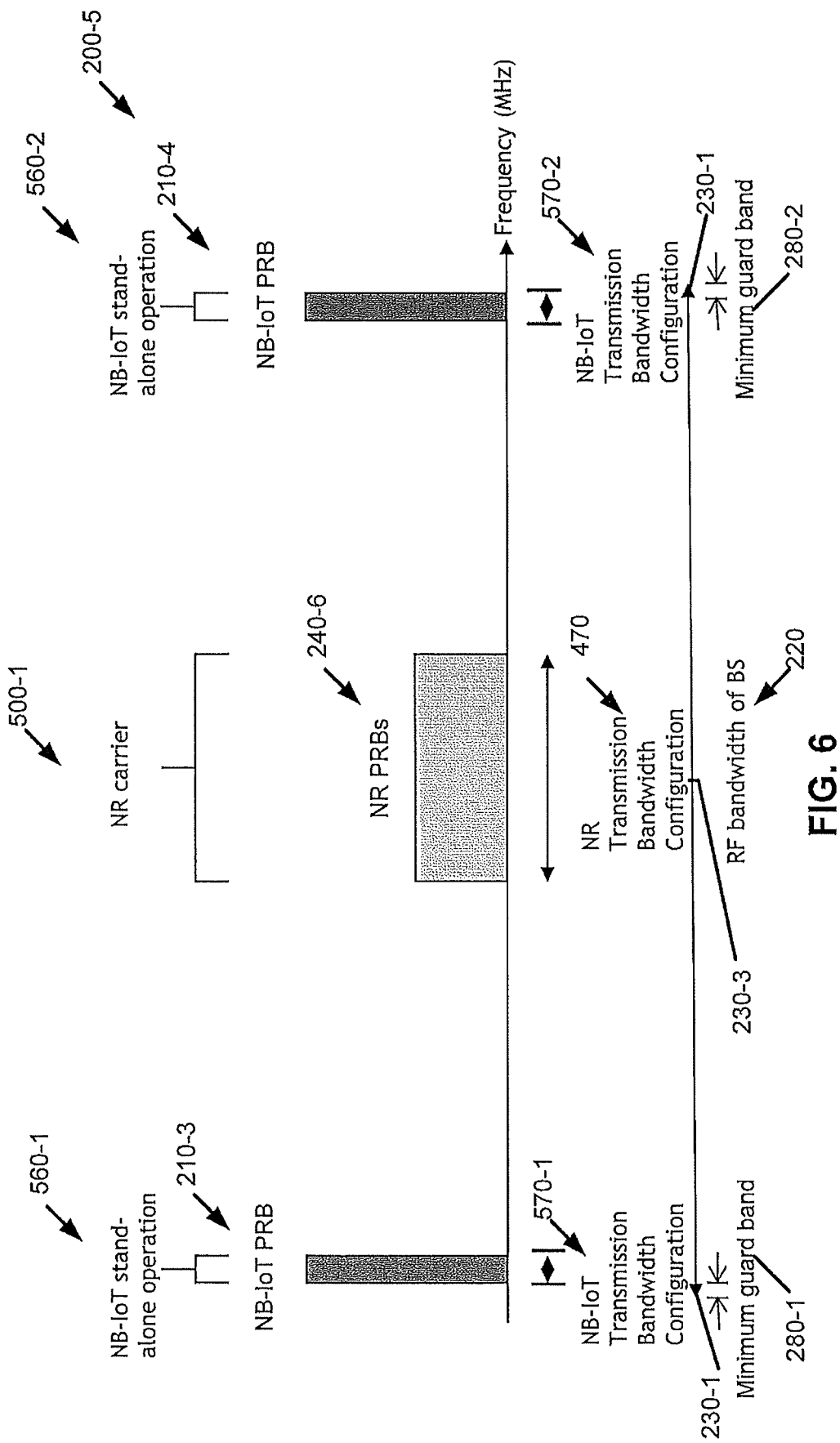
FIG. 6 illustrates one test configuration comprising one stand-alone NB-IoT carrier that is placed at each edge of the BS RF bandwidth, while one or more NR carrier(s) is(are) placed in the middle of the BS RF bandwidth, in accordance with an exemplary embodiment.

In another exemplary embodiment, indicated in FIG. 6, another test configuration 200-5 is shown. In this test configuration, there is one stand-alone NB-IoT carrier (each represented by a corresponding NB-IoT PRB 210-3, 210-4) placed at each edge 230-1, 230-2 of the BS RF bandwidth 220 in a corresponding NB-IoT transmission bandwidth configuration 570-1, 570-2 and in an NB-IoT stand-alone operation 560-1, 560-2. Meanwhile, one or more NR carriers 360-1 is(are) placed (illustrated by the NR PRBs 240-6) in or around the middle 230-3 of the BS RF bandwidth 220, for a NR transmission configuration bandwidth 370-1. The minimum guard bands 280-1, 280-2 are also illustrated.

It is noted that the power boost requirements are not specified for stand-alone operation, as there may not be the NR carrier to be used as a power reference. However, the same power is allocated to each NB-IoT or NR carrier in the test, so in fact the NB-IoT PRB is power boosted compared to the NR PRBs, as the NR carrier as a much wider bandwidth to cover with the same power, i.e., NB-IoT PRB has NRB times the NR PRN power, where NRB is the number of RB in the NR carrier. This results in a power boost of a stand-alone NB-IoT PRB to be indeed larger than 6 dB, as there are more than four RBs in the NR carrier for the same power to cover. See, e.g., clause 4.10.7 in 3GPP TS 36.141, which states in part that the power of each carrier should be set to the same level so that the sum of the carrier powers equals the rated total output.

Figure 7:
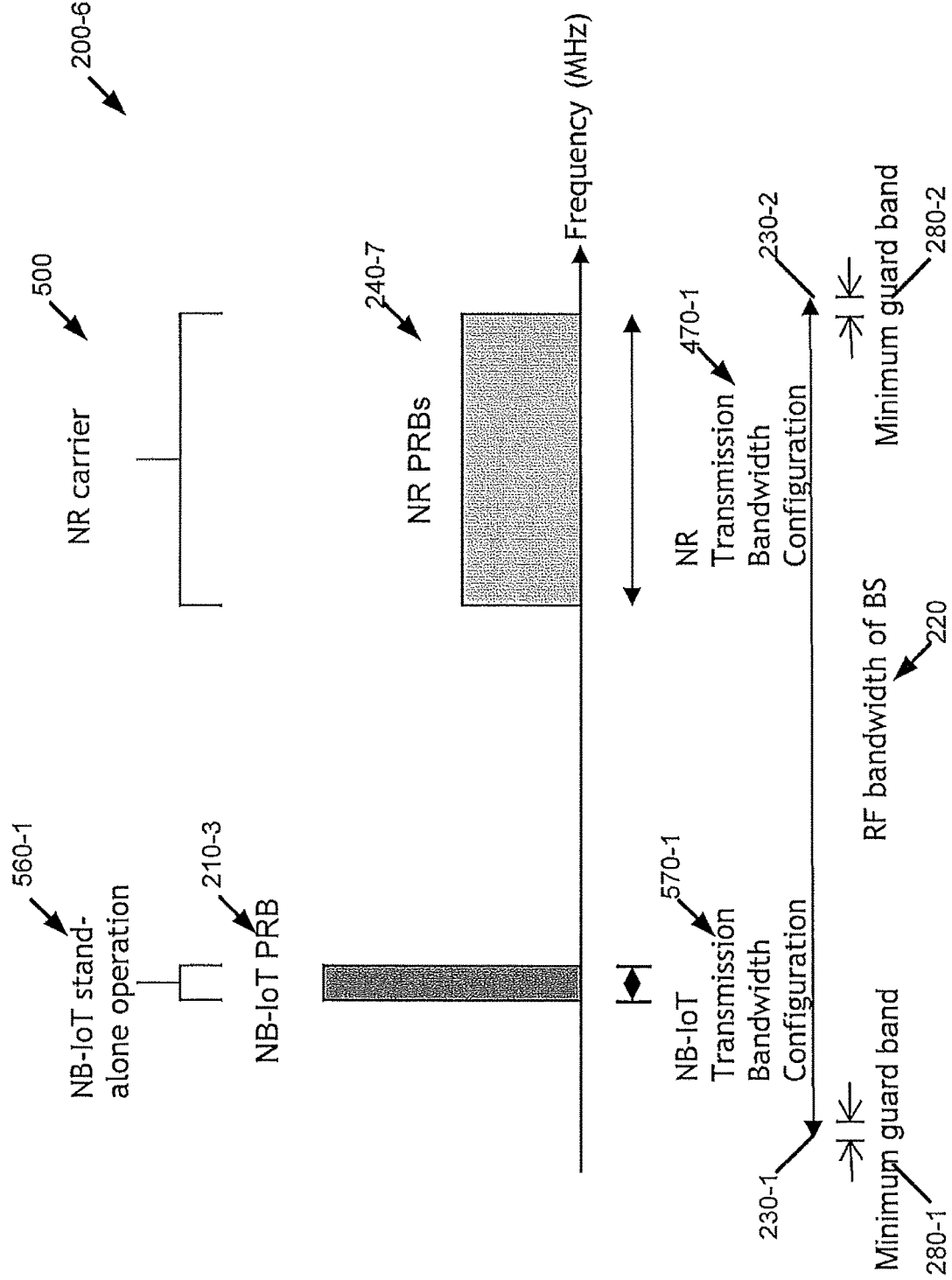
FIG. 7 illustrates one test configuration comprising one or more stand-alone NB-IoT carrier(s) that is(are) placed as the outermost carrier at one edge of the BS RF bandwidth, while one or more NR carrier is(are) placed at the other edge of the BS RF bandwidth, in accordance with an exemplary embodiment.

In a further possible embodiment, illustrated by FIG. 7, an additional test configuration 200-6 is shown, comprising one or more stand-alone NB-IoT carriers (illustrated as NB-IoT PRBs 210-3 in the NR-IoT stand-alone operation 560-1) that is(are) placed as the outermost carrier at one edge 230-1 of the BS RF bandwidth 220 as part of the NB-IoT transmission bandwidth configuration 570-1, while one or more NR carriers 360 is(are) placed (illustrated by the NR PRBs 240-7) at the other edge 230-2 of the BS RF bandwidth 220 for the NR transmission bandwidth configuration 370. The minimum guard bands 280-1, 280-2 are also illustrated. This test configuration verifies the BS performance in a practical deployment where the configured bandwidth is less than the maximum supported bandwidth. For instance, this could be the case when an operator selects to operate the BS with the bandwidth of the BS 220 that is below its maximum RF bandwidth for reasons such as part of the spectrum remains used by older radio technology like GSM.

Figure 8:
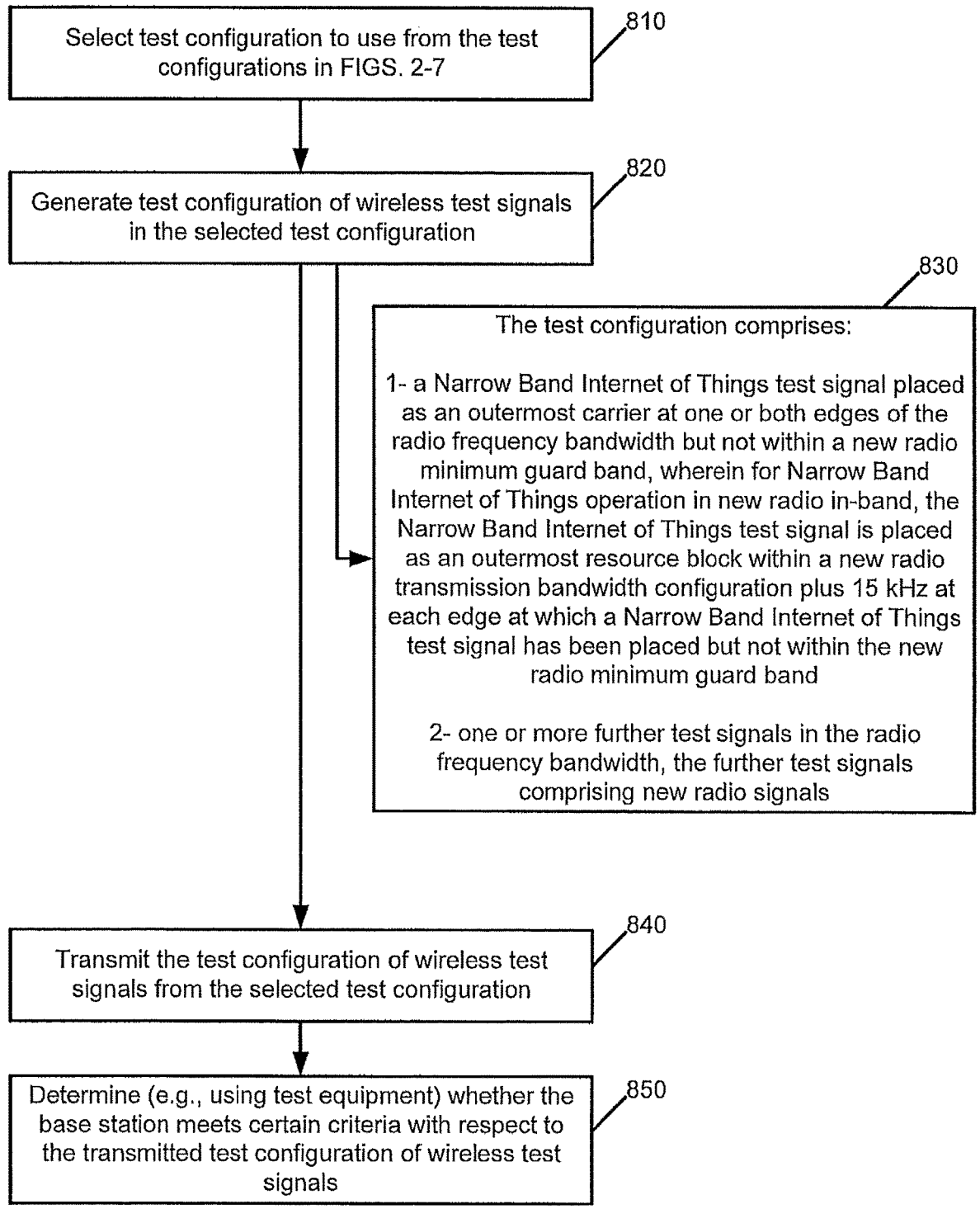
FIG. 8 is a logic flow diagram for testing base stations that support New Radio (NR) and Narrowband Internet of Things (NB-IoT) signals, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 8, this figure is a logic flow diagram for testing base stations that support New Radio (NR) and Narrowband Internet of Things (NB-IoT) signals. This figure also illustrates the operation of an exemplary method or methods, a result of execution of computer program instructions embodied on a computer readable memory, functions performed by logic implemented in hardware, and/or interconnected means for performing functions in accordance with exemplary embodiments. Most of the blocks in FIG. 8 are assumed to be performed by a network node such as the BS 170, e.g., under control of the control module 150 at least in part.

In block 810, the BS 170 selects a test configuration 200 to use from the test configurations 200-1 through 200-6 in FIGS. 2-7, respectively. In block 820, the BS 170 generates a test configuration of wireless test signals in the selected test configuration. The generation may be performed, e.g., by a signal generator, as part of the transmitter 163. As illustrated by block 830, the test configuration comprises: 1—a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at each edge at which a Narrow Band Internet of Things test signal has been placed but not within the new radio minimum guard band; and 2—one or more further test signals in the radio frequency bandwidth, the further test signals comprising new radio signals. In block 840, the BS 170 transmits the set of wireless test signals from the selected test configuration. The transmission may be performed by the transmitter 163.

In block 850, test equipment determines whether the base station 170 meets certain criteria with respect to the transmitted set of wireless test signals. The test equipment could be structured similar to the UE 110, such as having processors and memories and receivers. Such criteria could be, e.g., a spurious emission limit specified in the standards or by local regulations. The types of criteria, types of testing equipment, and how to determine whether the BS meets or does not meet the criteria are outside the scope of this document. It is noted that Rohde & Schwarz provide suitable base station test equipment such as the CMW500 wideband radio communication tester.

The following are additional examples.

Example 1. A method, comprising:

generating a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises:

a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and one or more further test signals, comprising new radio signals, in the radio frequency bandwidth; and transmitting from the base station the test configuration of wireless signals.

Example 2. The method of example 1, wherein the test configuration comprises a Narrow Band Internet of Things test signal placed as the outermost carrier at both edges of the radio frequency bandwidth but not within a new radio minimum guard band, and two further test signals comprising the new radio signals in the radio frequency bandwidth, each of the two further test signals adjacent to but could be separated by a 15 kHz region from a corresponding Narrow Band Internet of Things test signal, and wherein each combination of Narrow Band Internet of Things and associated one of the two further test signals has either a first bandwidth plus 15 kHz or the first bandwidth.

Example 3. The method of example 1, wherein the test configuration comprises a Narrow Band Internet of Things test signal placed as the outermost carrier at one edge of the radio frequency bandwidth but not within a new radio minimum guard band, and two further test signals comprising the new radio signals in the radio frequency bandwidth, one of the two further test signals adjacent to but could be separated by a 15 kHz region from the Narrow Band Internet of Things test signal and another of the two further test signals placed at the other edge of the radio frequency bandwidth, wherein the other of the two further test signals has a first bandwidth and the one of the two further test signals together with the Narrow Band Internet of Things test signal has either the first bandwidth plus 15 kHz or the first bandwidth.

Example 4. The method of example 1, wherein the test configuration comprises a Narrow Band Internet of Things test signal placed as the outermost carrier at both edges of the radio frequency bandwidth but not within a new radio minimum guard band, and at least two further test signals comprising the new radio signals in the radio frequency bandwidth, each of the two further test signals adjacent to but could be separated by a 15 kHz region from a corresponding Narrow Band Internet of Things test signal, and at least one third further test signal comprising the new radio signals in the radio frequency bandwidth, the at least one third further test signal being placed between but not adjacent to the two ends of the radio frequency bandwidth, and wherein the at least one third further test signal has a first bandwidth and each of the two further test signals together with the Narrow Band Internet of Things test signal have either the first bandwidth plus 15 kHz or the first bandwidth.

Example 5. The method of example 1, wherein the test configuration comprises a Narrow Band Internet of Things test signal placed as an outermost carrier at one edge of the radio frequency bandwidth but not within a first 100 kHz of the one edge, and one further test signal comprises the new radio signals in the radio frequency bandwidth, wherein the one further test signal is placed at the other edge of the radio frequency bandwidth.

Example 6. The method of example 1, wherein the test configuration comprises a Narrow Band Internet of Things test signal placed as the outermost carrier at both edges of the radio frequency bandwidth but not within a first 100 kHz of the edges, and one further test signal comprises the new radio signals in the radio frequency bandwidth, the one further test signal being placed between but not adjacent to the two ends of the radio frequency bandwidth.

Example 7. The method of example 1, wherein the test configuration comprises a Narrow Band Internet of Things test signal placed as the outermost carrier at one edge of the radio frequency bandwidth but not within a first 100 kHz of the one edge and one further test signal comprises the new radio signals in the radio frequency bandwidth, wherein the one further test signal is placed at the other edge of the radio frequency bandwidth, wherein the radio frequency bandwidth is less than a maximum supported bandwidth.

Example 8. The method of any of examples 1 to 7, wherein the Narrow Band Internet of Things test signal for at least any Narrow Band Internet of Things test signals adjacent to or separated at least by 15 kHz from new radio signals is power boosted compared to an average power over the new radio signals.

Example 9. The method of example 8, wherein the power boost is one of at least 6 dB or at least 3 dB.

Example 10. The method of any of examples 1 to 9, wherein the method further comprises, in response to the Narrow Band Internet of Things signals being needed to be operated within new radio in-band, and there is not any actual evolved universal terrestrial radio access carrier for hosting a Narrow Band Internet of Things in-band or guard band, configuring the base station in a Narrow Band Internet of Things guard band operation mode to generate a Narrow Band Internet of Things carrier for at least a duration of transmitting the test configuration.

Example 11. The method of any of examples 1 to 10, further comprising determining whether the base station meets the one or more criteria based on the generated and transmitted test configuration of wireless signals.

Example 12. A computer program, comprising code for performing the methods of any of examples 1 to 11, when the computer program is run on a computer.

Example 13. The computer program according to example 12, wherein the computer program is a computer program product comprising a computer-readable medium bearing computer program code embodied therein for use with the computer.

Example 14. The computer program according to example 12, wherein the computer program is directly loadable into an internal memory of the computer.

Example 15. An apparatus, comprising:

means for generating a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises:

a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and one or more further test signals, comprising new radio signals, in the radio frequency bandwidth; and means for transmitting from the base station the test configuration of wireless signals.

Example 16. The apparatus of example 15, wherein the test configuration comprises a Narrow Band Internet of Things test signal placed as the outermost carrier at both edges of the radio frequency bandwidth but not within a new radio minimum guard band, and two further test signals comprising the new radio signals in the radio frequency bandwidth, each of the two further test signals adjacent to but could be separated by a 15 kHz region from a corresponding Narrow Band Internet of Things test signal, and wherein each combination of Narrow Band Internet of Things and associated one of the two further test signals has either a first bandwidth plus 15 kHz or the first bandwidth.

Example 17. The apparatus of example 15, wherein the test configuration comprises a Narrow Band Internet of Things test signal placed as the outermost carrier at one edge of the radio frequency bandwidth but not within a new radio minimum guard band, and two further test signals comprising the new radio signals in the radio frequency bandwidth, one of the two further test signals adjacent to but could be separated by a 15 kHz region from the Narrow Band Internet of Things test signal and another of the two further test signals placed at the other edge of the radio frequency bandwidth, wherein the other of the two further test signals has a first bandwidth and the one of the two further test signals together with the Narrow Band Internet of Things test signal has either the first bandwidth plus 15 kHz or the first bandwidth.

Example 18. The apparatus of example 15, wherein the test configuration comprises a Narrow Band Internet of Things test signal placed as the outermost carrier at both edges of the radio frequency bandwidth but not within a new radio minimum guard band, and at least two further test signals comprising the new radio signals in the radio frequency bandwidth, each of the two further test signals adjacent to but could be separated by a 15 kHz region from a corresponding Narrow Band Internet of Things test signal, and at least one third further test signal comprising the new radio signals in the radio frequency bandwidth, the at least one third further test signal being placed between but not adjacent to the two ends of the radio frequency bandwidth, and wherein the at least one third further test signal has a first bandwidth and each of the two further test signals together with the Narrow Band Internet of Things test signal have either the first bandwidth plus 15 kHz or the first bandwidth.

Example 19. The apparatus of example 15, wherein the test configuration comprises a Narrow Band Internet of Things test signal placed as an outermost carrier at one edge of the radio frequency bandwidth but not within a first 100 kHz of the one edge, and one further test signal comprises the new radio signals in the radio frequency bandwidth, wherein the one further test signal is placed at the other edge of the radio frequency bandwidth.

Example 20. The apparatus of example 15, wherein the test configuration comprises a Narrow Band Internet of Things test signal placed as the outermost carrier at both edges of the radio frequency bandwidth but not within a first 100 kHz of the edges, and one further test signal comprises the new radio signals in the radio frequency bandwidth, the one further test signal being placed between but not adjacent to the two ends of the radio frequency bandwidth.

Example 21. The apparatus of example 15, wherein the test configuration comprises a Narrow Band Internet of Things test signal placed as the outermost carrier at one edge of the radio frequency bandwidth but not within a first 100 kHz of the one edge and one further test signal comprises the new radio signals in the radio frequency bandwidth, wherein the one further test signal is placed at the other edge of the radio frequency bandwidth, wherein the radio frequency bandwidth is less than a maximum supported bandwidth.

Example 22. The apparatus of any of examples 15 to 21, wherein the Narrow Band Internet of Things test signal for at least any Narrow Band Internet of Things test signals adjacent to or separated at least by 15 kHz from new radio signals is power boosted compared to an average power over the new radio signals.

Example 23. The apparatus of example 22, wherein the power boost is one of at least 6 dB or at least 3 dB.

Example 24. The apparatus of any of examples 15 to 23, further comprising means, responsive to the Narrow Band Internet of Things signals being needed to be operated within new radio in-band, and there is not any actual evolved universal terrestrial radio access carrier for hosting a Narrow Band Internet of Things in-band or guard band, for configuring the base station in a Narrow Band Internet of Things guard band operation mode to generate a Narrow Band Internet of Things carrier for at least a duration of transmitting the test configuration.

Example 25. The apparatus of any of examples 15 to 24, further comprising means for determining whether the base station meets the one or more criteria based on the generated and transmitted test configuration of wireless signals.

Example 26. A base station comprising the apparatus of any of examples 15 to 24.

Example 27. A wireless communication system comprising the apparatus of any of examples 15 to 24.

Example 28. An apparatus, comprising:
at least one processor; and
at least one memory including computer program code,
the at least one memory and the computer program code configured, with the at least one processor, to cause the apparatus to perform operations comprising:
generating a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises:
a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and
one or more further test signals, comprising new radio signals, in the radio frequency bandwidth; and
transmitting from the base station the test configuration of wireless signals.

Example 29. The apparatus of example 28, wherein the test configuration comprises a Narrow Band Internet of Things test signal placed as the outermost carrier at both edges of the radio frequency bandwidth but not within a new radio minimum guard band, and two further test signals comprising the new radio signals in the radio frequency bandwidth, each of the two further test signals adjacent to but could be separated by a 15 kHz region from a corresponding Narrow Band Internet of Things test signal, and wherein each combination of Narrow Band Internet of Things and associated one of the two further test signals has either a first bandwidth plus 15 kHz or the first bandwidth.

Example 30. The apparatus of example 28, wherein the test configuration comprises a Narrow Band Internet of Things test signal placed as the outermost carrier at one edge of the radio frequency bandwidth but not within a new radio minimum guard band, and two further test signals comprising the new radio signals in the radio frequency bandwidth, one of the two further test signals adjacent to but could be separated by a 15 kHz region from the Narrow Band Internet of Things test signal and another of the two further test signals placed at the other edge of the radio frequency bandwidth, wherein the other of the two further test signals has a first bandwidth and the one of the two further test signals together with the Narrow Band Internet of Things test signal has either the first bandwidth plus 15 kHz or the first bandwidth.

Example 31. The apparatus of example 28, wherein the test configuration comprises a Narrow Band Internet of Things test signal placed as the outermost carrier at both edges of the radio frequency bandwidth but not within a new radio minimum guard band, and at least two further test signals comprising the new radio signals in the radio frequency bandwidth, each of the two further test signals adjacent to but could be separated by a 15 kHz region from a corresponding Narrow Band Internet of Things test signal, and at least one third further test signal comprising the new radio signals in the radio frequency bandwidth, the at least one third further test signal being placed between but not adjacent to the two ends of the radio frequency bandwidth, and wherein the at least one third further test signal has a first bandwidth and each of the two further test signals together with the Narrow Band Internet of Things test signal have either the first bandwidth plus 15 kHz or the first bandwidth.

Example 32. The apparatus of example 28, wherein the test configuration comprises a Narrow Band Internet of Things test signal placed as an outermost carrier at one edge of the radio frequency bandwidth but not within a first 100 kHz of the one edge, and one further test signal comprises the new radio signals in the radio frequency bandwidth, wherein the one further test signal is placed at the other edge of the radio frequency bandwidth.

Example 33. The apparatus of example 28, wherein the test configuration comprises a Narrow Band Internet of Things test signal placed as the outermost carrier at both edges of the radio frequency bandwidth but not within a first 100 kHz of the edges, and one further test signal comprises the new radio signals in the radio frequency bandwidth, the one further test signal being placed between but not adjacent to the two ends of the radio frequency bandwidth.

Example 34. The apparatus of example 28, wherein the test configuration comprises a Narrow Band Internet of Things test signal placed as the outermost carrier at one edge of the radio frequency bandwidth but not within a first 100 kHz of the one edge and one further test signal comprises the new radio signals in the radio frequency bandwidth, wherein the one further test signal is placed at the other edge of the radio frequency bandwidth, wherein the radio frequency bandwidth is less than a maximum supported bandwidth.

Example 35. The apparatus of any of examples 28 to 34, wherein the Narrow Band Internet of Things test signal for at least any Narrow Band Internet of Things test signals adjacent to or separated at least by 15 kHz from new radio signals is power boosted compared to an average power over the new radio signals.

Example 36. The apparatus of example 35, wherein the power boost is one of at least 6 dB or at least 3 dB.

Example 37. The apparatus of any of examples 28 to 36, wherein the at least one memory and the computer program code are further configured, with the at least one processor, to cause the apparatus to perform operations comprising: responsive to the Narrow Band Internet of Things signals being needed to be operated within new radio in-band, and there is not any actual evolved universal terrestrial radio access carrier for hosting a Narrow Band Internet of Things in-band or guard band, configuring the base station in a Narrow Band Internet of Things guard band operation mode to generate a Narrow Band Internet of Things carrier for at least a duration of transmitting the test configuration.

Example 38. The apparatus of any of examples 28 to 37, further comprising test equipment configured to determine whether the base station meets the one or more criteria based on the generated and transmitted test configuration of wireless signals.

Example 39. A computer program product comprising a computer-readable storage medium bearing computer program code embodied therein for use with a computer, the computer program code comprising:

code for generating a test configuration of wireless signals for testing a base station, which supports Narrow Band Internet of Things signals and new radio signals, for compliance with one or more criteria, the base station being configured to support multiple carriers and to support operation within a radio frequency bandwidth, wherein the test configuration comprises:

a Narrow Band Internet of Things test signal placed as an outermost carrier at one or both edges of the radio frequency bandwidth but not within a new radio minimum guard band, wherein for Narrow Band Internet of Things operation in new radio in-band, the Narrow Band Internet of Things test signal is placed as an outermost resource block within a new radio transmission bandwidth configuration plus 15 kHz at an edge but not within the new radio minimum guard band; and one or more further test signals, comprising new radio signals, in the radio frequency bandwidth; and code for transmitting from the base station the test configuration of wireless signals.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method, comprising:
generating a test configuration of wireless signals for testing a base station, which supports narrow band internet of things signals and new radio signals, for compliance with one or more criteria, the base station being configured to support multiple carriers and to support operation within a radio frequency bandwidth, wherein the test configuration comprises:
a narrow band internet of things test signal placed as an outermost carrier at one or both edges of the radio frequency bandwidth but not within a new radio minimum guard band, wherein for narrow band internet of things operation in new radio in-band, the narrow band internet of things test signal is placed as an outermost resource block within a new radio transmission bandwidth configuration plus 15 kHz at an edge but not within the new radio minimum guard band, wherein the narrow band internet of things test signal for at least any narrow band internet of things test signals adjacent to or separated at least by 15 kHz from new radio signals is power boosted compared to an average power over the new radio signals; and
one or more further test signals, comprising new radio signals, in the radio frequency bandwidth; and
transmitting from the base station the test configuration of wireless signals.

2. The method of claim 1, wherein the test configuration comprises a narrow band internet of things test signal placed as the outermost carrier at both edges of the radio frequency bandwidth but not within a new radio minimum guard band, and two further test signals comprising the new radio signals in the radio frequency bandwidth, each of the two further test signals adjacent to or separated by a 15 kHz region from a corresponding narrow band internet of things test signal, and wherein each combination of narrow band internet of things and associated one of the two further test signals has either a first bandwidth plus 15 kHz or the first bandwidth.

3. The method of claim 1, wherein the test configuration comprises a narrow band internet of things test signal placed as the outermost carrier at one edge of the radio frequency bandwidth but not within a new radio minimum guard band, and two further test signals comprising the new radio signals in the radio frequency bandwidth, one of the two further test signals adjacent to or separated by a 15 kHz region from the narrow band internet of things test signal and another of the two further test signals placed at the other edge of the radio frequency bandwidth, wherein the other of the two further test signals has a first bandwidth and the one of the two further test signals together with the narrow band internet of things test signal has either the first bandwidth plus 15 kHz or the first bandwidth.

4. The method of claim 1, wherein the test configuration comprises a narrow band internet of things test signal placed as the outermost carrier at both edges of the radio frequency bandwidth but not within a new radio minimum guard band, and at least two further test signals comprising the new radio signals in the radio frequency bandwidth, each of the two further test signals adjacent to or separated by a 15 kHz region from a corresponding narrow band internet of things test signal, and at least one third further test signal comprising the new radio signals in the radio frequency bandwidth, the at least one third further test signal being placed between but not adjacent to the two ends of the radio frequency bandwidth, and wherein the at least one third further test signal has a first bandwidth and each of the two further test signals together with the narrow band internet of things test signal have either the first bandwidth plus 15 kHz or the first bandwidth.

5. The method of claim 1, wherein the test configuration comprises a narrow band internet of things test signal placed as an outermost carrier at one edge of the radio frequency bandwidth but not within a first 100 kHz of the one edge, and one further test signal comprises the new radio signals in the radio frequency bandwidth, wherein the one further test signal is placed at the other edge of the radio frequency bandwidth.

6. The method of claim 1, wherein the test configuration comprises a narrow band internet of things test signal placed as the outermost carrier at both edges of the radio frequency bandwidth but not within a first 100 kHz of the edges, and one further test signal comprises the new radio signals in the radio frequency bandwidth, the one further test signal being placed between but not adjacent to the two ends of the radio frequency bandwidth.

7. The method of claim 1, wherein the test configuration comprises a narrow band internet of things test signal placed as the outermost carrier at one edge of the radio frequency bandwidth but not within a first 100 kHz of the one edge and one further test signal comprises the new radio signals in the radio frequency bandwidth, wherein the one further test signal is placed at the other edge of the radio frequency bandwidth, wherein the radio frequency bandwidth is less than a maximum supported bandwidth.

8. The method of claim 1, wherein the method further comprises, in response to the narrow band internet of things signals being needed to be operated within new radio in-band, and there is not any actual evolved universal terrestrial radio access carrier for hosting a narrow band internet of things in-band or guard band, configuring the base station in a narrow band internet of things guard band operation mode to generate a narrow band internet of things carrier for at least a duration of transmitting the test configuration.

9. The method of claim 1, wherein the power boost is one of at least 6 dB or at least 3 dB.

10. An apparatus, comprising:
at least one processor; and
at least one memory storing instructions that, when executed by the at least one processor, cause the apparatus at least to:
generate a test configuration of wireless signals for testing a base station, which supports narrow band internet of things signals and new radio signals, for compliance with one or more criteria, the base station being configured to support multiple carriers and to support operation within a radio frequency bandwidth, wherein the test configuration comprises:
a narrow band internet of things test signal placed as an outermost carrier at one or both edges of the radio frequency bandwidth but not within a new radio minimum guard band, wherein for narrow band internet of things operation in new radio in-band, the narrow band internet of things test signal is placed as an outermost resource block within a new radio transmission bandwidth configuration plus 15 kHz at an edge but not within the new radio minimum guard band, wherein the narrow band internet of things test signal for at least any narrow band internet of things test signals adjacent to or separated at least by 15 kHz from new radio signals is power boosted compared to an average power over the new radio signals; and
one or more further test signals, comprising new radio signals, in the radio frequency bandwidth; and
transmit from the base station the test configuration of wireless signals.

11. The apparatus of claim 10, wherein the test configuration comprises a narrow band internet of things test signal placed as the outermost carrier at both edges of the radio frequency bandwidth but not within a new radio minimum guard band, and two further test signals comprising the new radio signals in the radio frequency bandwidth, each of the two further test signals adjacent to or separated by a 15 kHz region from a corresponding narrow band internet of things test signal, and wherein each combination of narrow band internet of things and associated one of the two further test signals has either a first bandwidth plus 15 kHz or the first bandwidth.

12. The apparatus of claim 10, wherein the test configuration comprises a narrow band internet of things test signal placed as the outermost carrier at one edge of the radio frequency bandwidth but not within a new radio minimum guard band, and two further test signals comprising the new radio signals in the radio frequency bandwidth, one of the two further test signals adjacent to or separated by a 15 kHz region from the narrow band internet of things test signal and another of the two further test signals placed at the other edge of the radio frequency bandwidth, wherein the other of the two further test signals has a first bandwidth and the one of the two further test signals together with the narrow band internet of things test signal has either the first bandwidth plus 15 kHz or the first bandwidth.

13. The apparatus of claim 10, wherein the test configuration comprises a narrow band internet of things test signal placed as the outermost carrier at both edges of the radio frequency bandwidth but not within a new radio minimum guard band, and at least two further test signals comprising the new radio signals in the radio frequency bandwidth, each of the two further test signals adjacent to or separated by a 15 kHz region from a corresponding narrow band internet of things test signal, and at least one third further test signal comprising the new radio signals in the radio frequency bandwidth, the at least one third further test signal being placed between but not adjacent to the two ends of the radio frequency bandwidth, and wherein the at least one third further test signal has a first bandwidth and each of the two further test signals together with the narrow band internet of things test signal have either the first bandwidth plus 15 kHz or the first bandwidth.

14. The apparatus of claim 10, wherein the test configuration comprises a narrow band internet of things test signal placed as an outermost carrier at one edge of the radio frequency bandwidth but not within a first 100 kHz of the one edge, and one further test signal comprises the new radio signals in the radio frequency bandwidth, wherein the one further test signal is placed at the other edge of the radio frequency bandwidth.

15. The apparatus of claim 10, wherein the test configuration comprises a narrow band internet of things test signal placed as the outermost carrier at both edges of the radio frequency bandwidth but not within a first 100 kHz of the edges, and one further test signal comprises the new radio signals in the radio frequency bandwidth, the one further test signal being placed between but not adjacent to the two ends of the radio frequency bandwidth.

16. The apparatus of claim 10, wherein the test configuration comprises a narrow band internet of things test signal placed as the outermost carrier at one edge of the radio frequency bandwidth but not within a first 100 kHz of the one edge and one further test signal comprises the new radio signals in the radio frequency bandwidth, wherein the one further test signal is placed at the other edge of the radio frequency bandwidth, wherein the radio frequency bandwidth is less than a maximum supported bandwidth.

17. The apparatus of claim 10, wherein the power boost is one of at least 6 dB or at least 3 dB.

18. The apparatus claim 10, wherein the instructions, when executed by the at least one processor, cause the apparatus to: responsive to the narrow band internet of things signals being needed to be operated within new radio in-band, and there is not any actual evolved universal terrestrial radio access carrier for hosting a narrow band internet of things in-band or guard band, configure the base station in a narrow band internet of things guard band operation mode to generate a narrow band internet of things carrier for at least a duration of transmitting the test configuration.

19. The apparatus of claim 10, further comprising test equipment configured to determine whether the base station meets the one or more criteria based on the generated and transmitted test configuration of wireless signals.

20. A computer program product comprising a computer-readable storage medium bearing computer program code embodied therein for use with a computer, wherein the computer program code includes:
code for generating a test configuration of wireless signals for testing a base station, which supports narrow band Internet of things signals and new radio signals, for compliance with one or more criteria, the base station being configured to support multiple carriers and to support operation within a radio frequency bandwidth, wherein the test configuration comprises:

a narrow band internet of things test signal placed as an outermost carrier at one or both edges of the radio frequency bandwidth but not within a new radio minimum guard band, wherein for narrow band internet of things operation in new radio in-band, the narrow band Internet of things test signal is placed as an outermost resource block within a new radio transmission bandwidth configuration plus 15 kHz at an edge but not within the new radio minimum guard band wherein the narrow band internet of things test signal for at least any narrow band internet of things test signals adjacent to or separated at least by 15 kHz from new radio signals is power boosted compared to an average power over the new radio signals; and one or more further test signals, comprising new radio signals, in the radio frequency bandwidth; and code for transmitting from the base station the test configuration of wireless signals.

* * * * *